United States Patent
Jehle et al.

(10) Patent No.: US 9,979,040 B2
(45) Date of Patent: May 22, 2018

(54) REDOX DEVICE

(71) Applicant: Astrium GmbH, Taufkirchen (DE)

(72) Inventors: Walter Jehle, Horgenzell (DE);
Sebastian Markgraf, Immenstaad (DE); Willigert Raatschen, Immenstaad (DE); Joachim Lucas, Herdwangen-Schoenach (DE)

(73) Assignee: Airbus DS GmbH, Taufkirchen (DE)

( * ) Notice: Subject to any disclaimer, the term of this patent is extended or adjusted under 35 U.S.C. 154(b) by 217 days.

(21) Appl. No.: 14/177,418

(22) Filed: Feb. 11, 2014

(65) Prior Publication Data

US 2014/0242479 A1 Aug. 28, 2014

(30) Foreign Application Priority Data

Feb. 27, 2013 (EP) ..................... 13156999

(51) Int. Cl.
| | |
|---|---|
| H01M 8/00 | (2016.01) |
| H01M 8/18 | (2006.01) |
| C25B 1/04 | (2006.01) |
| H01M 8/0662 | (2016.01) |
| H01M 4/86 | (2006.01) |
| H01M 8/04223 | (2016.01) |

(Continued)

(52) U.S. Cl.
CPC ............... H01M 8/188 (2013.01); C25B 1/04 (2013.01); C25B 9/08 (2013.01); H01M 4/8657 (2013.01); H01M 8/04223 (2013.01); H01M 8/0662 (2013.01); H01M 8/186 (2013.01); H01M 8/04197 (2016.02); H01M 8/083 (2013.01); Y02E 60/366 (2013.01); Y02E 60/528 (2013.01); Y02P 70/56 (2015.11)

(58) Field of Classification Search
CPC .. H01M 8/188; H01M 8/186; H01M 8/04223; H01M 8/0662; H01M 8/04261; H01M 8/083; H01M 4/8657

See application file for complete search history.

(56) References Cited

U.S. PATENT DOCUMENTS

| | | | |
|---|---|---|---|
| 4,248,682 A | 2/1981 | Lindstrom et al. | |
| 7,722,834 B2 | 5/2010 | Riegel et al. | |

(Continued)

FOREIGN PATENT DOCUMENTS

| | | |
|---|---|---|
| CA | 1 198 710 A1 | 12/1985 |
| DE | 10 2007 027 720 A1 | 12/2008 |

(Continued)

OTHER PUBLICATIONS

Search Report dated Aug. 9, 2013 in the corresponding EP application No. 13 156 999.8 (with partial English translation).

(Continued)

*Primary Examiner* — Nicholas P D'Aniello
(74) *Attorney, Agent, or Firm* — Posz Law Group, PLC (57) ABSTRACT

A redox device, in particular a hydrogen-oxygen redox device, includes at least one redox unit which is provided for carrying out at least one redox reaction with consumption and/or production of a first gas, in particular hydrogen gas, and/or of a second gas, in particular oxygen gas. The redox device includes at least one gas purification unit for freeing the hydrogen gas of contamination by oxygen gas and/or freeing the oxygen gas of contamination by hydrogen gas.

11 Claims, 4 Drawing Sheets

(51) Int. Cl.
*C25B 9/08* (2006.01)
*H01M 8/083* (2016.01)
*H01M 8/04082* (2016.01)

(56) References Cited

U.S. PATENT DOCUMENTS

| | | |
|---|---|---|
| 2002/0098393 A1 | 7/2002 | Dine et al. |
| 2002/0119365 A1 | 8/2002 | Tomazic |
| 2004/0028966 A1* | 2/2004 | Hibbs ............... H01M 8/04097 429/410 |
| 2004/0074764 A1 | 4/2004 | Lohrberg et al. |
| 2006/0222912 A1* | 10/2006 | Smith ..................... C25B 9/18 429/418 |
| 2008/0213635 A1 | 9/2008 | Blaszczyk et al. |
| 2009/0008261 A1 | 1/2009 | Kotzeva et al. |
| 2009/0325012 A1 | 12/2009 | Nor |

FOREIGN PATENT DOCUMENTS

| | | |
|---|---|---|
| DE | 10 2007 027720 A1 | 12/2008 |
| EP | 1 674 424 A1 | 6/2006 |
| JP | 2004-521447 A | 7/2004 |
| JP | 2005-5087 A | 1/2005 |
| JP | 2005-276529 A | 10/2005 |
| JP | 2007-109428 A | 4/2007 |
| JP | 2008-524780 A | 7/2008 |
| JP | 2008-198402 A | 8/2008 |
| JP | 2009-110675 A | 5/2009 |
| JP | 2009-140677 A | 6/2009 |
| JP | 2010-282768 A | 12/2010 |

OTHER PUBLICATIONS

European Search Report dated Aug. 9, 2013 issued in the corresponding EP patent application No. 13156999.8.
Office Action dated Jun. 9, 2015 in the corresponding CA application No. 2,843,671.
Office Action dated Oct. 14, 2016 issued in corresponding CA patent application No. 2,843,671.
H.G. Oswin. "Platinum Metals in the Fuel Cell, Their Function and Applications in Electrode Structures", Platinum Metals Rev., 1964, 8, (2), pp. 42-48.
Office Action dated Apr. 18, 2017 issued in corresponding JP patent application No. 2014-028486 (and English translation)

* cited by examiner

REDOX DEVICE

CROSS REFERENCE TO RELATED APPLICATION

This application is based on and incorporates herein by reference European Patent Application No. 13156999.8 filed on Feb. 27, 2013.

PRIOR ART

The claimed invention ("invention" or "claimed invention") relates to a redox device having at least one redox unit.

Redox devices having at least one redox unit configured as fuel cell or electrolyzer according to the prior art are flushed with an inert flushing gas, usually nitrogen, after a shutdown in order to prevent residual amounts of gases used, e.g. hydrogen and oxygen, which remain in gas spaces of the redox unit after shutdown, from coming into contact with one another by diffusion and from being induced to form an explosive mixture, for example a hydrogen/oxygen gas mixture, in the redox unit, said mixture being induceable to explode due to energy input, in particular when the redox unit is started up once again, as a result of which the redox unit can be damaged. Particularly in the case of the redox devices which are being developed at present and which have a redox unit configured as fuel cell and a redox unit configured as electrolyzer, intended for closed operation as "regenerative fuel cell system", this method cannot be used for preventing formation of hydrogen/oxygen gas mixtures because of the necessity of opening the system for flushing with inert flushing gas.

It is, in particular, an objective of the claimed invention to provide a redox device which offers a high degree of safety in respect of hazards due to hydrogen/oxygen gas mixtures, with the hydrogen/oxygen gas mixture hazards occurring as a result of contamination of the oxygen gas by hydrogen gas or contamination of the hydrogen gas by oxygen gas. The objective is achieved according to the claimed invention, while advantageous embodiments and further developments of the claimed invention can also be derived from the dependent claims.

Advantages of the Invention

The invention proceeds from a redox device, in particular a hydrogen-oxygen redox device, having at least one redox unit, in particular a hydrogen-oxygen redox unit, which is provided for carrying out at least one redox reaction with consumption and/or production of a first gas, in particular hydrogen gas, and/or of a second gas, in particular oxygen gas. It is proposed that the redox device has at least one gas purification unit for freeing the hydrogen gas of contamination by oxygen gas and/or freeing the oxygen gas of contamination by hydrogen gas.

A "redox device" is to be understood to mean, in particular, an apparatus having at least one redox unit. A "redox unit" is to be understood to mean a unit having at least two electrodes, one of which preferably is configured as a hydrogen electrode and one of which is configured as an oxygen electrode, with an electric circuit connecting the two electrodes, with at least one electrolyte arranged at least between the two electrodes and/or with an electrolyte-filled or ion-conducting membrane arranged at least between the two electrodes, wherein a redox reaction is carried out by means of the unit, in which redox reaction, with release of energy in the form of electric power which is released via the electric circuit, the first gas is oxidized and the second gas is reduced and these gases are converted in a reaction into a product, preferably water, which is released into the surroundings or a storage tank, or in which redox reaction a starting material, preferably water, is dissociated into a first gas, preferably molecular hydrogen, and a second gas, preferably molecular oxygen, under release of energy in the form of electric power and the first gas and the second gas are discharged into the surroundings or into storage tanks. In particular, the redox unit is configured as a fuel cell in which molecular hydrogen, preferably in the form of hydrogen gas, and molecular oxygen, preferably in the form of oxygen gas, react to form water with release of energy by generation of electric power, and/or as an electrolyzer for hydrogen and oxygen, in which water is dissociated into molecular oxygen and molecular hydrogen with uptake of energy in the form of electric power. In principle, another chemical substance which contains hydrogen atoms and oxygen atoms can be used instead of water as product or starting material. For example, the redox unit can, instead of being configured as a hydrogen-oxygen redox unit, be configured as a redox unit for other substances, which converts the other substances in a redox reaction similar to the redox reaction of the hydrogen-oxygen redox unit, for example as a carbon monoxide-oxygen redox unit which converts carbon monoxide and oxygen gas into carbon dioxide or dissociates carbon dioxide into carbon monoxide and oxygen gas. A "redox reaction" is to be understood to mean, in particular, a reaction in which at least two chemical substances react with one another, with at least one chemical substance releasing electrons and thus being oxidized and at least one chemical substance taking up electrons and thus being reduced. "Hydrogen gas" is to be understood to mean, in particular, hydrogen in molecular form which is present as gas. "Oxygen gas" is to be understood to mean, in particular, oxygen in molecular form which is present as gas.

In particular, the redox device can be configured as a regenerative fuel cell system having at least one fuel cell and at least one electrolyzer for hydrogen and oxygen coupled to the at least one fuel cell, wherein, in a charging process to store energy in the regenerative fuel cell system by means of external electric power, the at least one electrolyzer for hydrogen and oxygen dissociates water from a water stock into molecular hydrogen and molecular oxygen, the molecular hydrogen and the molecular oxygen each are discharged into storage tanks and, in a discharging process for release of energy as electric power, molecular hydrogen and molecular oxygen are converted in the at least one fuel cell into water. The regenerative fuel cell system thus performs a function of an accumulator. In particular, the regenerative fuel cell system can be configured for closed operation. For the purposes of the present invention, "closed operation" is to be understood to mean, in particular, operation in which the regenerative fuel cell system is operated over a plurality of charging-discharging cycles without exchange of material with surroundings. "Operation without exchange of material with surroundings" means, in particular, that the regenerative fuel cell system is equipped with an initial stock of water and/or molecular oxygen and/or molecular hydrogen in storage tanks, and only the initial stock of water and/or molecular oxygen and/or molecular hydrogen is converted over the plurality of charging-discharging cycles, and replenishment of the initial stock does not take place. In particular, removal of the storage tanks is not provided in an operation without exchange of material with the surroundings. An "electrolyte" is to be understood to mean, in particular, an ion-conducting material, preferably in the form of a solution, for example an alkaline solution. A "gas purification unit" is to be understood to mean, in particular, a unit which frees a gas of impurities, in particular of solids or foreign gases, for example by filtration or by conversion of the foreign gas into a liquid or solid form, wherein a chemical reaction can be used for the conversion. The gas purification unit for freeing the hydrogen gas of impurities due to oxygen gas and/or freeing the oxygen gas of impurities due to hydrogen gas is preferably at least partly arranged on and/or in a gas space of a redox unit and very particularly preferably within an interior region of the redox unit, which interior region is surrounded by cell walls. It is possible to achieve, in particular, a redox device having a high degree of operating safety and a reduced cost of operation by dispensing with a stock of inert flushing gas and with passage of inert flushing gas.

Furthermore, it is proposed that the at least one redox unit be configured as a fuel cell. It is possible to achieve, in particular, a fuel cell having a high degree of operational safety and a reduced cost of operation by dispensing with a stock of inert flushing gas and with passage of inert flushing gas.

It is also proposed that the fuel cell be configured as an alkaline fuel cell. For the purposes of the present invention, an "alkaline fuel cell" is, in particular, a fuel cell which uses an alkaline solution, in particular a potassium hydroxide solution, as electrolyte. Use of other alkaline solutions, for example hydrazine, as electrolyte is likewise possible. The hydrogen electrode and the oxygen electrode preferably consist at least partly of nickel. It is possible to achieve, in particular, an alkaline fuel cell having a high degree of operational safety and a reduced cost of operation by saving of a stock of inert flushing gas and passage of inert flushing gas.

Furthermore, it is proposed that the at least one redox unit be configured as electrolyzer for producing hydrogen gas and/or oxygen gas. In particular, the electrolyzer is configured as an alkaline electrolyzer which uses an alkaline solution, in particular a potassium hydroxide solution, as electrolyte. It is possible, in particular, to achieve an electrolyzer for producing hydrogen gas and/or oxygen gas having a high degree of operational safety and a reduced outlay in terms of apparatus by saving of a stock of inert flushing gas and passage of inert flushing gas.

It is also proposed that the at least one gas purification unit comprise at least one recombination catalyst unit for the recombination of oxygen gas and hydrogen gas to water. For the purposes of the present invention, a "recombination catalyst unit" is to be understood to mean, in particular, a unit which is provided for catalyzing recombination of hydrogen and oxygen at an intended place. In particular, the recombination catalyst unit makes available at least one surface at which molecular hydrogen and molecular oxygen can react to form water. In particular, the recombination catalyst unit is arranged at least partly at and/or in a gas space of a redox unit and very particularly preferably within an interior region surrounded by walls in the redox unit. In particular, the recombination catalyst unit is at least partly arranged within a gas flow from a gas store to a reaction zone of the redox unit and/or within the redox unit, preferably within the interior region surrounded by walls in the redox unit. A "reaction zone" is to be understood to mean, in particular, a contact region between the hydrogen electrode and the electrolyte and/or the membrane or between the oxygen electrode and the electrolyte and/or the membrane, at which contact region water is dissociated into hydrogen and/or oxygen or hydrogen and oxygen are synthesized into water. It is possible, in particular, to achieve a gas purification unit which requires low apparative input.

Furthermore, it is proposed that the recombination catalyst unit has at least one catalyst element which consists at least partly of a platinum metal. In particular, the at least one catalyst element at least partly has a coating of a platinum metal on at least one surface. The at least one catalyst element can in principle also consist entirely of a platinum metal and/or a plurality of platinum metals. A "platinum metal" is to be understood to mean, in particular, platinum or other noble metals which display chemical behavior similar to platinum, in particular the metals ruthenium, rhodium, palladium, osmium and iridium. In particular, nickel and darmstadtium as elements of the platinum group are different from platinum metals. It is possible to achieve, in particular, a chemically resistant catalyst element having a high catalysis activity.

It is also proposed that the at least one catalyst element be implemented as a catalyst layer applied to a side of at least one electrode of the at least one redox unit facing away from a reaction zone. A "reaction zone" is to be understood to mean, in particular, a region of the at least one electrode at which a reaction of hydrogen and oxygen to form water molecules and/or electrolytic dissociation of water molecules into hydrogen and oxygen takes place. In particular, the catalyst layer applied to the side of at least one electrode of the at least one redox unit facing away from the reaction zone is different from a catalyst layer of the at least one electrode, which catalyzes a redox reaction of the at least one redox unit. In particular, application of the catalyst layer to the side of at least one electrode facing away from a reaction zone is specifically intended to remove oxygen gas which leaves the reaction zone and penetrates into a gas space which is separate from the reaction zone and contains hydrogen gas and there represents a hydrogen/oxygen gas mixture hazard, and/or to remove hydrogen gas which penetrates into a gas space separate from the reaction zone and contains oxygen gas and there represents a hydrogen/oxygen gas mixture hazard, by catalyzed recombination to form water on entry into and/or residence in the gas space, which cannot be achieved by means of a catalyst layer in the reaction zone. It is possible to achieve, in particular, a gas purification unit which has an advantageously close arrangement at a zone in which hydrogen gas or oxygen gas is formed, and/or at an entry zone into a reaction region, and provides a high degree of operational safety of the redox device.

In a further development of the invention, it is proposed that the at least one catalyst element has a cavity structure. A "cavity structure" is, in particular, to be understood as a structure which has at least one hollow space, preferably a plurality of cavities, through which the gases can diffuse and/or flow from one side of the structure to another side of the structure. In particular, the plurality of cavities is formed by pores. The catalyst element having a cavity structure can in principle also have cavities configured as channels and/or a lattice network structure. Internal surfaces of the cavities are particularly preferably provided with a catalytic coating of a platinum metal. It is possible, in particular, to achieve a catalyst element having a high proportion of catalytically active surface and thus a high purifying performance.

Furthermore, it is proposed that the at least one catalyst element be arranged at a gas space of the at least one redox unit, which gas space adjoins at least one electrode of the at least one redox unit. For the purposes of the present invention, a "gas space of a redox unit" is to be understood to mean, in particular, a space within the redox unit which is bounded by an exterior wall of the redox unit, openings in the exterior wall for inflow or discharge of products and/or starting materials, in particular hydrogen gas and/or oxygen gas, and the hydrogen electrode or the oxygen electrode. It is possible to achieve, in particular, an advantageously close arrangement of the at least one catalyst element to a reaction zone and to gases formed in and/or entering the reaction zone.

Furthermore, it is proposed that the redox device has at least one further redox unit which is coupled to the at least one redox unit so as to allow exchange of material. For the purposes of the present invention, "coupled" means, in particular, that products of the at least one redox unit are utilized as starting materials for the at least one further redox unit and products of the at least one further redox unit are utilized as starting materials for the one further redox unit, and/or that the at least one redox unit and the at least one further redox unit have a joint starting material stock and/or product stock and a stream of starting materials is introduced into a plurality of redox units having the same type of structure. It is possible, in particular, to achieve utilization of incompletely reacted starting materials or provide a regenerative fuel cell system.

It is also proposed that the at least one redox unit and the at least one further redox unit be configured as a fuel cell-electrolyzer pair. In particular, the at least one redox unit and the at least one further redox unit thus form a regenerative fuel cell system. It is possible, in particular, to achieve an accumulator function of the redox device.

Furthermore, it is proposed that at least one gas flow from the at least one redox unit to the at least one further redox unit or from the at least one further redox unit to the at least one redox unit be purified by means of the at least one gas purification unit before leaving the at least one redox unit or the at least one further redox unit. For the purposes of the present invention, "leaving a redox unit" means, in particular, exit from a gas space, preferably a gas space enclosed by a cell frame of the redox unit, into a line which preferably leads to a storage tank or recirculates excess, unreacted starting gases back into an inlet line into the gas space. "Purification before leaving a redox unit" means, in particular, that the contamination by foreign and residual gases is eliminated by means of the gas purification unit within a gas space of the redox unit, preferably on entry into the gas space. It is possible to achieve, in particular, a high degree of operational safety.

Furthermore, it is proposed that at least one gas flow from the at least one redox unit to the at least one further redox unit or from the at least one further redox unit to the at least one redox unit be purified by means of the at least one gas purification unit before leaving the at least one redox unit or the at least one further redox unit. For the purposes of the present invention, "purification on leaving a redox unit" means, in particular, that at least one element of the gas purification unit is arranged in a transition region from the gas space to a line leading to a storage tank. It is possible to achieve, in particular, a high degree of operational safety.

DRAWINGS

Further advantages can be derived from the following description of the drawings. The drawings show six exemplary embodiments of the invention. The drawings, the description and the claims contain numerous features in combination. A person skilled in the art will advantageously also look at the features individually and combine them to give expedient further combinations.

The figures show.

DESCRIPTION OF THE EXEMPLARY EMBODIMENTS

Figure 1:
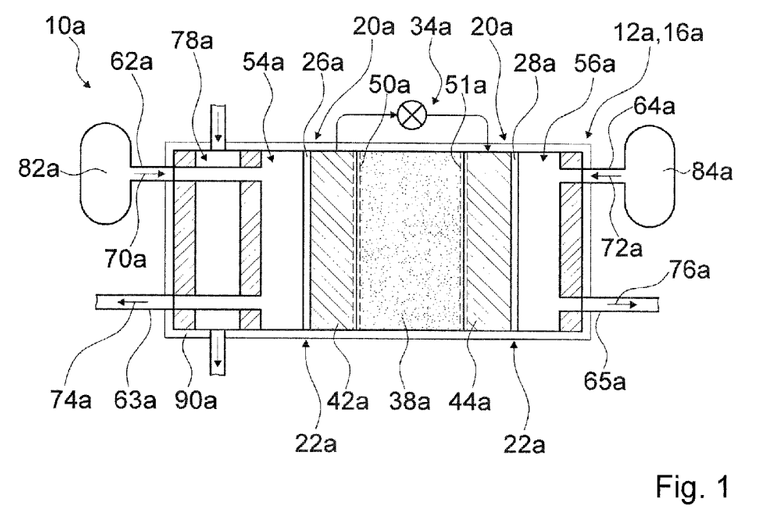
FIG. 1 a redox device according to the invention having a redox unit configured as alkaline fuel cell and having a gas purification unit which has a recombination catalyst unit comprising catalyst elements which are configured as a catalyst layer applied to a side of electrodes facing away from a reaction zone, FIG. 2 an alternative redox device having a redox unit configured as electrolyzer and having a gas purification unit which is configured as in the preceding exemplary embodiment, FIG. 3 a further redox device according to the invention having a redox unit configured as alkaline fuel cell and having a gas purification unit which has a recombination catalyst unit comprising catalyst elements arranged in an outlet from a gas space, FIG. 4 a further redox device according to the invention having a redox unit configured as electrolyzer and having a gas purification unit which is configured as in the preceding exemplary embodiment, FIG. 5 a redox device according to the invention having a redox unit configured as alkaline fuel cell, a redox unit configured as electrolyzer which is coupled so as to allow exchange of material to the alkaline fuel cell, and having a gas purification unit configured as in FIG. 1 and FIG. 2, and FIG. 6 a further redox device according to the invention having a redox unit configured as alkaline fuel cell, a redox unit configured as electrolyzer which is coupled so as to allow exchange of material to the alkaline fuel cell, and having a gas purification unit configured as in FIG. 3 and FIG. 4.

FIG. 1 shows a redox device 10a according to the invention which is configured as hydrogen-oxygen redox device and has a redox unit 12a which is configured as hydrogen-oxygen redox unit and is provided for carrying out at least one redox reaction consuming hydrogen gas as a first gas and oxygen gas as a second gas and comprises an electrode 42a configured as hydrogen electrode, an electrode 44a configured as oxygen electrode and an electrolyte-filled membrane 38a located in between. The electrodes 42a, 44a are implemented as nickel electrodes. The redox unit 12a is configured as a fuel cell 16a, in fact an alkaline fuel cell 16a in which an electrolyte with which the membrane 38a is filled is formed by a potassium hydroxide solution. In the fuel cell 16a, hydrogen gas and oxygen gas are reacted to form water by means of a redox reaction at the electrodes 42a, 44a, releasing energy in the form of electric current which flows through a power consumer 34a arranged in an electric circuit between the electrodes 42a, 44a. Closure of the electric circuit is achieved by charge transport via the electrolyte-filled membrane 38a. The fuel cell 16a is operated at an operating temperature in the temperature range from 80 to 200 degrees Celsius. To heat the fuel cell 16a to operating temperature, the fuel cell 16a has a heating unit 78a in which liquid for heat transport flows. Furthermore, heat of reaction evolved on operation of the fuel cell 16a can be transported away by means of the heating unit 78a in order to avoid overheating of the fuel cell 16a.

The redox device 10a has a gas store 82a which is connected to the redox unit 12a configured as alkaline fuel cell 16a via a line 62a and has a stock of hydrogen gas, and a gas store 84a which is connected to the fuel cell 16a via a line 64a and has a stock of oxygen gas. Hydrogen and oxygen are present in the gas stores 82a, 84a as pure gases in molecular form. A gas flow 70a of hydrogen gas is conveyed from the gas store 82a through the line 62a into a gas space 54a which is bounded by a cell frame 90a of the redox unit 12a and by the electrode 42a configured as hydrogen electrode, and from which gas space it is passed through the electrode 42a into a reaction zone 50a formed by a contact zone of membrane 38a and electrode 42a. In the reaction zone 50a, a redox reaction of hydrogen molecules of the hydrogen gas with hydroxide ions to form water takes place, in which electrons are released and flow as an electric current via the power consumer 34a and release energy in the process. Excess hydrogen gas is discharged in a gas flow 74a via a line 63a, with the excess hydrogen gas being able to be recirculated again to the fuel cell 16a. Oxygen gas is correspondingly introduced in a gas flow 72a via the line 64a into a gas space 56a and goes through the electrode 44a into a reaction zone 51a formed by a contact zone of membrane 38a and electrode 44a. In the reaction zone 51a, the oxygen gas is reduced together with water, which originates, for example, from the potassium hydroxide solution or has been previously produced in the fuel cell 16a, in a redox reaction and converted with uptake of electrons into hydroxide ions. An overall reaction in the reaction zones 50a, 51a produces water since more water molecules are produced in the reaction zone 50a than are reacted in the reaction zone 51a with oxygen gas to form hydroxide ions. Excess oxygen gas is discharged via a line 65a into a gas flow 76a. Water formed is discharged as reaction product in the form of water vapor via the gas flows 74a, 76a.

The redox device 10a according to the invention has a gas purification unit 20a for freeing the hydrogen gas as first gas of impurities by means of the oxygen gas as the second gas, and/or freeing the oxygen gas as second gas of impurities by means of hydrogen gas as the first gas. Contamination of the hydrogen gas by oxygen gas and of the oxygen gas by hydrogen gas can occur, in particular, during a rest state of the redox unit 12a of the redox device 10a by residual gases remaining in the gas spaces 54a, 56a and in the reaction zones 50a, 51a diffusing through the membrane 38a of the redox unit 12a. The gas purification unit 20a comprises a catalyst unit 22a for catalyzing a reaction of oxygen gas and hydrogen gas to water, which catalyst unit 22a has two catalyst elements 26a, 28a consisting partly of a platinum metal. The catalyst elements 26a, 28a are each configured as a catalyst layer applied to a side of the electrodes 42a, 44a in the redox unit 12a configured as alkaline fuel cell 16a, said side facing away from the reaction zone 50a, 51a. The catalyst layer consists of a platinum layer to which hydrogen and oxygen are bonded, as a result of which a reaction of hydrogen and oxygen to form water is catalyzed. Instead of a catalyst layer composed of platinum, it is also possible to apply a catalyst layer composed of another platinum metal, for example palladium, ruthenium or iridium. The arrangement of the catalyst elements 26a, 28a in each case on the side of the electrodes 42a, 44a facing away from the reaction zone 50a, 51a enables removal of contamination by foreign gases exiting from the reaction zone 50a, 51a and entering the gas spaces 54a, 56a. Endangering of the fuel cell 16a by hydrogen/oxygen gas mixture formation is thus avoided. Furthermore, waste heat of reaction released by recombination of hydrogen and oxygen is released directly at the electrodes 42a, 44a and is utilized for heating the redox unit 12a, as a result of which energy consumption for heating the redox unit 12a to operating temperature can be reduced. In a method for operating a redox device 10a, gas flows 74a, 76a are thus purified by means of the gas purification unit 20a before leaving the gas spaces 54a, 56a.

Five further exemplary embodiments of the invention are shown in FIGS. 2 to 6. The following descriptions and the drawings are essentially restricted to the differences between the exemplary embodiments, where with regard to components having the same designation, in particular with regard to components having the same reference numerals, reference can in principle also be made to the drawings and/or the description of the other exemplary embodiments, in particular FIG. 1. To distinguish the exemplary embodiments, the letter a is placed after the reference numerals for the exemplary embodiment in FIG. 1. In the exemplary embodiments of FIGS. 2 to 6, the letter a is replaced by the letters b to f.

Figure 2:
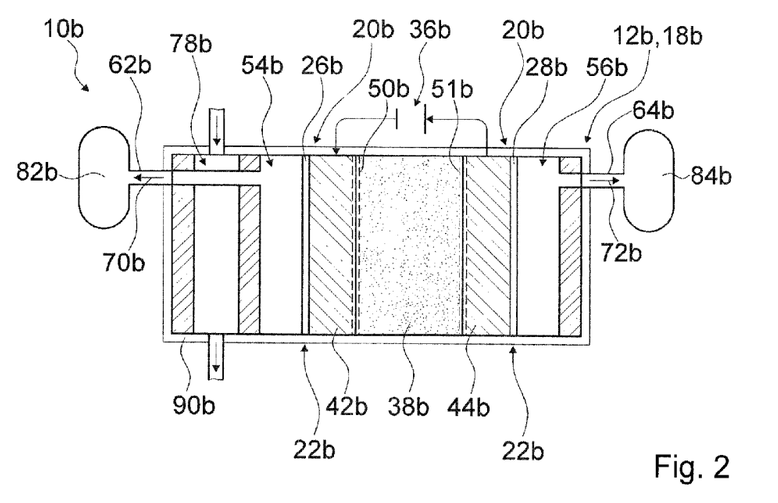

FIG. 2 shows an alternative embodiment of a redox device 10b according to the invention having a redox unit 12b provided for carrying out a redox reaction consuming and/or producing a first gas implemented as hydrogen gas and a second gas implemented as oxygen gas, and having a gas purification unit 20b for freeing the hydrogen gas of contamination by oxygen gas and freeing the oxygen gas of contamination by hydrogen gas. The redox unit 12b is configured as electrolyzer 18b for producing hydrogen gas and/or oxygen gas, which for this purpose electrolytically dissociates water. The electrolyzer 18b is configured as an alkaline electrolyzer 18b. A structure of the redox unit 12b is essentially analogous to the previously shown structure. Since energy in the form of electric power is required for dissociating the water, a power source 36b configured as a DC voltage source is arranged in an electric circuit so as to supply this electric power. The hydrogen gas formed in a reaction zone 50b in a contact region of an electrode 42b and an electrolyte-filled membrane 38b enters a gas space 54b and is from there conveyed in a gas flow 70b through a line 62b into a gas store 82b. Correspondingly, oxygen gas formed in a reaction zone 51b in a contact region of an electrode 44b and the electrolyte-filled membrane 38b is conveyed via a gas space 56b and a line 64b as a gas flow 72b into a gas store 84b. A potassium hydroxide solution is likewise used as electrolyte. The gas purification unit 20b of the redox device 10b likewise comprises a catalyst unit 22b for catalyzing a reaction of oxygen gas and hydrogen gas into water, which has two catalyst elements 26b, 28b which consist partly of a platinum metal. The catalyst elements 26b, 28b are, as in the above example, each configured as a catalyst layer of platinum applied to a side of the electrodes 42b, 44b facing away from the reaction zone 50b, 51b in the electrolyzer 18b. In a method for operating a redox device 10b, gas flows 70b, 72b are thus purified by means of the gas purification unit 20b before leaving the gas spaces 54b, 56b. Furthermore, waste heat of reaction released by recombination of hydrogen and oxygen is released in the gas spaces 54b, 56b and is utilized for heating the redox unit 12b, as a result of which the energy consumption for heating the redox unit 12b to operating temperature can be reduced.

Figure 3:
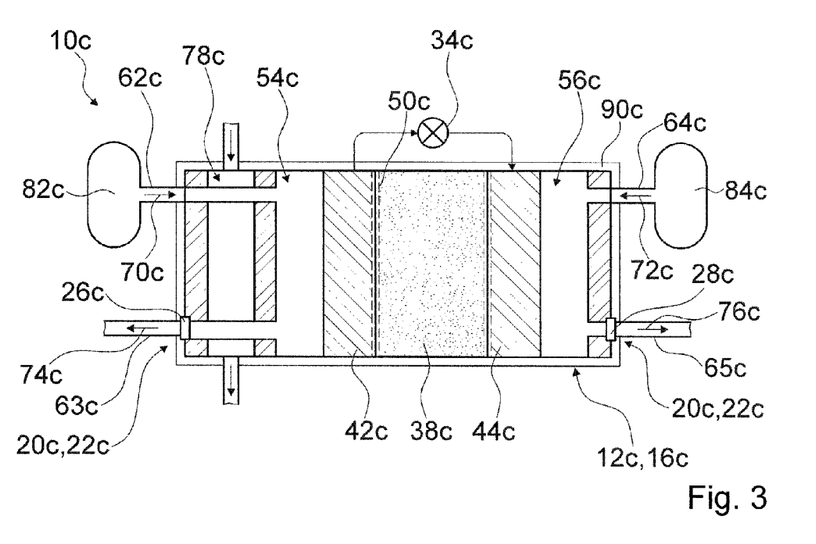

In a further embodiment of a redox device 10c according to the invention having a redox unit 12c provided for carrying out a redox reaction with consumption of a first gas implemented as hydrogen gas and a second gas implemented as oxygen gas, and having a gas purification unit 20c for freeing the hydrogen gas of contamination by oxygen gas and freeing the oxygen gas of contamination by hydrogen gas, the redox unit 12c is, as in the first exemplary embodiment, configured as fuel cell 16c, more precisely as alkaline fuel cell 16c (FIG. 3). The redox device 10c differs from that shown in the first exemplary embodiment by a design of the gas purification unit 20c. The gas purification unit 20c comprises a catalyst unit 22c to catalyze a reaction of oxygen gas and hydrogen gas to water, which has two catalyst elements 26c, 28c which consist partly of a platinum metal. The catalyst elements 26c, 28c each have a cavity structure implemented as a pore structure in a support material, with surfaces of the pore structure being provided with a catalyst coating composed of platinum or another platinum metal. When gas passes through the pore structure of the catalyst elements 26c, 28c, a high purification efficiency is achieved as a result of a large catalytically active surface due to the pore structure. The catalyst elements 26c, 28c are each arranged in outlets from gas spaces 54c, 56c to lines 63c, 65c which convey excess hydrogen gas and oxygen gas in gas flows 74c, 76c out of the gas spaces 54c, 56c. In a method for operating the redox device 10c, gas flows 74c, 76c are thus purified by means of the gas purification unit 20c on leaving the gas spaces 54c, 56c. In alternative embodiments of the gas purification unit 20c, it is conceivable, for example, to arrange the catalyst elements 26c, 28c having cavity structures within the gas spaces 54c, 56c and, in a method for operating the redox device 10c, to purify gas flows 74c, 76c by means of the gas purification unit 20c before they leave the gas spaces 54c, 56c.

Figure 4:
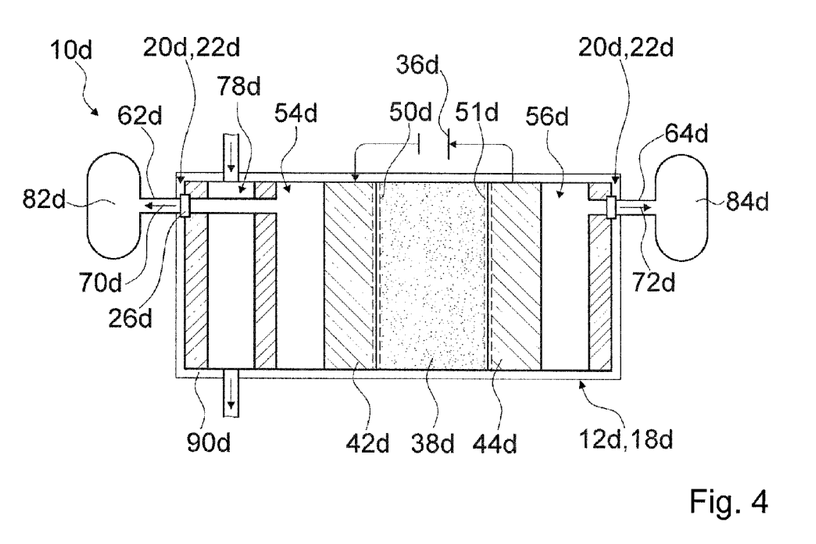

In a further embodiment of a redox device 10d according to the invention having a redox unit 12d which is provided for carrying out a redox reaction with production of a first gas implemented as hydrogen gas and a second gas implemented as oxygen gas, the redox unit 12d is, as in the second exemplary embodiment, configured as electrolyzer 18d, more precisely as alkaline electrolyzer 18d, for producing hydrogen gas and/or oxygen gas (FIG. 4). The redox device 10d comprises a gas purification unit 20d for freeing the hydrogen gas of contamination by oxygen gas and for freeing the oxygen gas of contamination by hydrogen gas, which comprises a catalyst unit 22d for catalyzing a reaction of oxygen gas and hydrogen gas into water. The catalyst unit 22d has two catalyst elements 26d, 28d which consist partly of a platinum metal and are, as in the previous exemplary embodiment, configured as cavity structures having platinum-coated surfaces. The catalyst elements 26d, 28d are located in outlets of gas spaces 54d, 56d to lines 62d, 64d which lead to gas stores 82d, 84d, so that gas flows 70d, 72d are purified by means of the gas purification unit 20d on leaving the redox unit 12d.

In a further exemplary embodiment of a redox device 10e according to the invention having a redox unit 12e provided for carrying out a redox reaction with consumption of a first gas implemented as hydrogen gas and a second gas implemented as oxygen gas, the redox device 10e comprises a further redox unit 14e which is coupled to the redox unit 12e (FIG. 5) so as to allow exchange of material. The redox unit 12e and the further redox unit 14e are configured as a fuel cell-electrolyzer pair, with the redox unit 12e being configured as an alkaline fuel cell 16e and the redox unit 14e being configured as an alkaline electrolyzer 18e. The redox device 10e is thus configured as a regenerative fuel cell system in which hydrogen gas and oxygen gas produced with consumption of energy in the electrolyzer 18e and stored in gas stores 82e, 84e are reacted to form water under release of energy in further operation of the fuel cell 16d. In particular, in a method for operating the redox device 10e according to the invention, the redox device 10e is operated in closed operation, and therefore replenishment of an initial stock of hydrogen gas, oxygen gas and water in the gas stores 82e, 84e and a water store 86e and also the redox unit 12e and the further redox unit 14e is not carried out. Alternate operation of the electrolyzer 18e and the alkaline fuel cell 16e enables the redox device 10e to assume an accumulator function.

Figure 5:
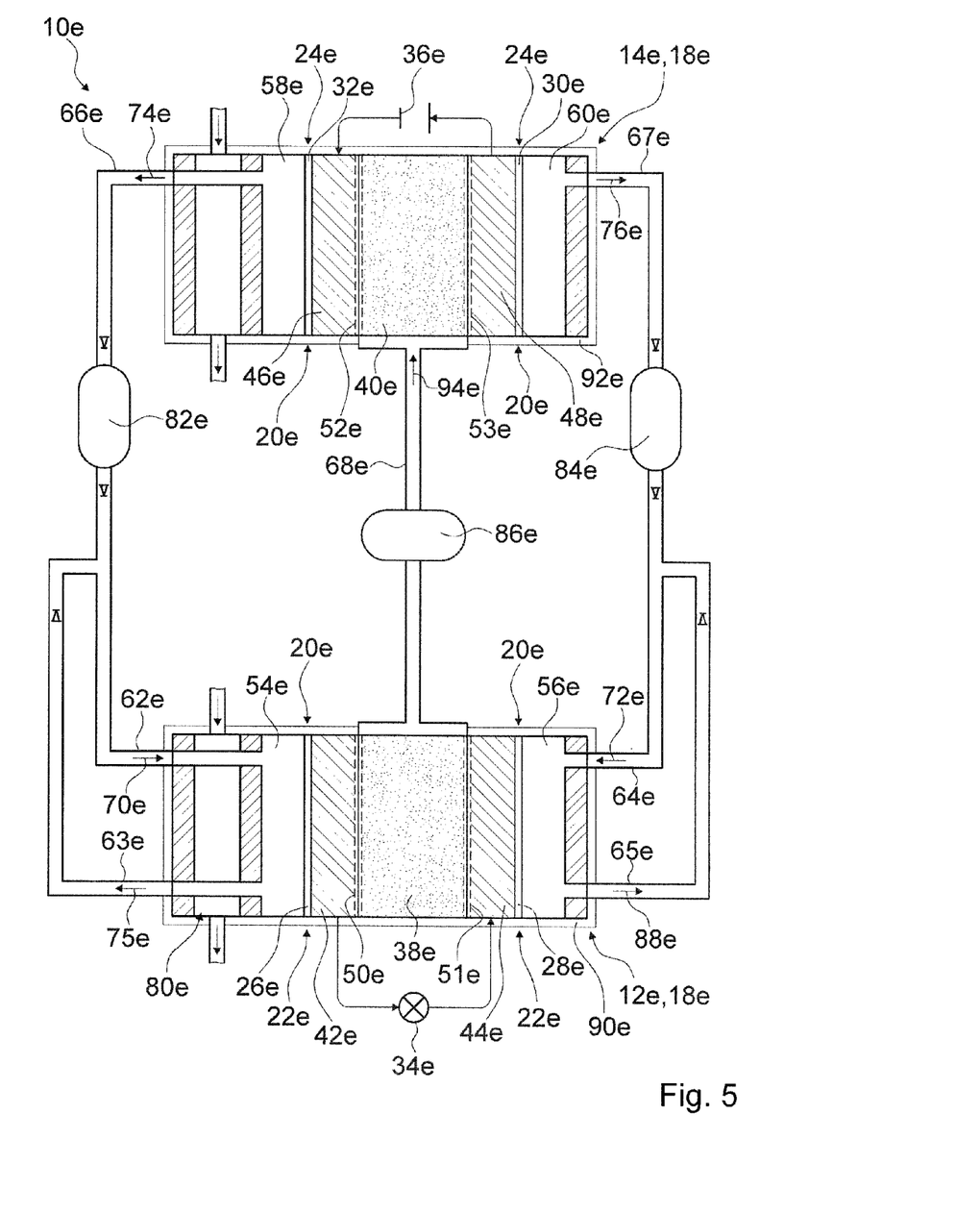

A water flow 94e is fed from a water store 86e via a line 68a to a membrane 40e, which is filled with a potassium hydroxide solution, of the further redox unit 14e which is configured as alkaline electrolyzer 18e. In reaction zones 52e, 53e, at which the membrane 40e and electrodes 46e, 48e adjoin one another, hydrogen gas and oxygen gas are produced. The hydrogen gas produced in the reaction zone 52e at the electrode 46e passes through the electrode 46e into a gas space 58e of the electrolyzer 18e and is discharged in a gas flow 74e via a line 66e into the gas store 82e. The hydrogen gas produced in the reaction zone 53e at the electrode 48e passes through the electrode 46e into a gas space 60e and is discharged in a gas flow 76e via a line 67e into the gas store 84e. Hydrogen gas from the gas store 82e is conveyed in a gas flow 70e via a line 62e into a gas space 54e of the redox unit 12e configured as alkaline fuel cell 16e and oxygen gas is analogously conveyed in a gas flow 72e via a line 64e into a gas space 56e. Excess hydrogen gas is fed back in a gas flow 75e through a line 63e to the fuel cell 16e in a circuit, while excess oxygen gas is fed back in a gas flow 88e through a line 65e to the fuel cell 16e in a circuit. To regulate the introduction and discharge of gases, all lines 62e, 63e, 64e, 65e, 66e, 67e, 68e are equipped with valves. The redox unit 12e and the further redox unit 14e are connected via the gas store 82e and the lines 62e, 63e, 66e and via the gas store 84e and the lines 64e, 65e, 67e. Gas flows 70f, 74f and gas flows 72f, 76f flow from the further redox unit 14e to the redox unit 12e. In the fuel cell 16e, oxygen gas and hydrogen gas are converted in a known manner into water, at an electrode 42e and a membrane 38e in a reaction zone 50e and at an electrode 44e and the membrane 38e in a reaction zone 51e, to produce energy which is utilized by a power consumer 34e. The redox unit 12e has a heating unit 80e, and the further redox unit 14e has a cell frame 92e.

The redox device 10e according to the invention has a gas purification unit 20e which comprises a catalyst unit 22e which is arranged in the redox unit 12e and a catalyst unit 24e which is arranged in the further redox unit 14e. The catalyst unit 22e has two catalyst elements 26e, 28e consisting of platinum and, as in the first exemplary embodiment, are configured as a catalyst layer applied to a side of the electrodes 42e, 44e facing away from the reaction zone 50e, 51e. The catalyst unit 24e correspondingly has two catalyst elements 30e, 32e consisting of platinum and which are, as in the second exemplary embodiment, configured as a catalyst layer applied to a side of the electrodes 46e, 48e facing away from the reaction zone 52e, 53e. In a method for operating the redox device 10e according to the invention, gas flows 70e, 72e, 74e, 76e from the further redox unit 14e configured as electrolyzer 18e to the redox unit 12e are thus purified in the above-described manner by means of the gas purification unit 20e before leaving the further redox unit 14e. Furthermore, in the method for operating the redox device 10e according to the invention, gas flows 75e, 88e to the gas stores 82e, 84e are purified by means of the gas purification unit 20e before leaving the redox unit 12e.

Figure 6:
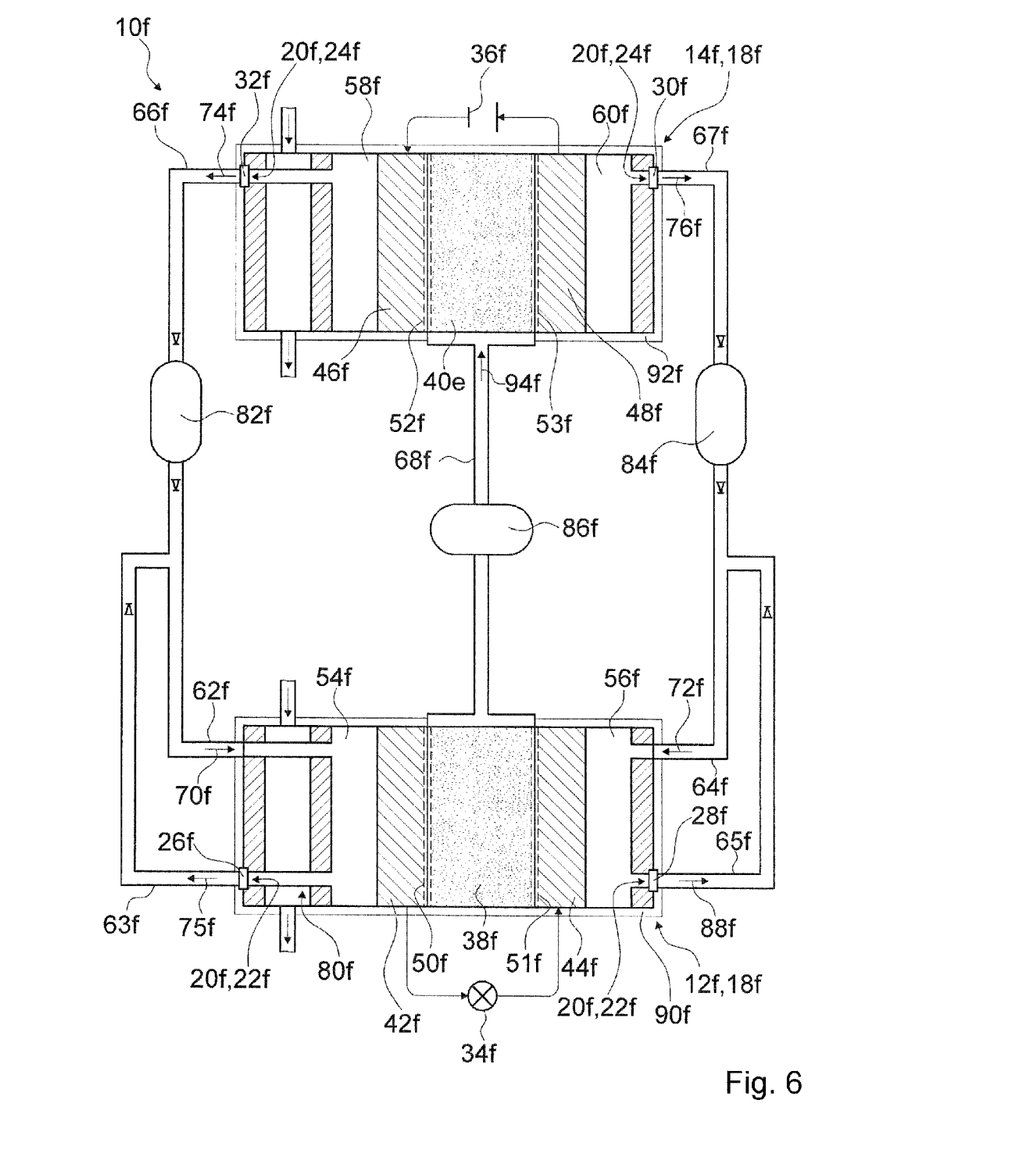

FIG. 6 shows a further alternative redox device 10f according to the invention having a redox unit 12f which is provided for carrying out a redox reaction with consumption of a first gas implemented as hydrogen gas and a second gas implemented as oxygen gas, having a further redox unit 14f which is coupled, so as to allow exchange of material, to the redox unit 12f, and having a gas purification unit 20f which comprises a catalyst unit 22f arranged in the redox unit 12f and a catalyst unit 24f arranged in the further redox unit 14f. The redox unit 12f and the further redox unit 14f are configured as a fuel cell-electrolyzer pair, with the redox unit 12f being configured as an alkaline fuel cell 16f and the redox unit 14f being configured as electrolyzer 18f. The exemplary embodiment shown differs from the previous exemplary embodiment in a design of catalyst elements 26f, 28f, 30f, 32f of the catalyst units 22f, 24f, which each have a cavity structure having platinum-coated surfaces. The catalyst elements 26f, 28f of the catalyst unit 22f are arranged in outlets from gas spaces 54f, 56f, 58f, 60f to lines 63f, 65f, 66f, 67f to gas stores 82f, 84f. In a method for operating the redox device 10f according to the invention, gas flows 70f, 72f, 74f, 76f from the further redox unit 14f to the redox unit 12f are thus purified by means of the at least one gas purification unit 20f on leaving the further redox unit 14f. Furthermore, in a method for operating the redox device 10f according to the invention, gas flows 75f, 88f are purified by means of the gas purification unit 20f on leaving the redox unit 12f, with in each case hydrogen gas in the gas flows 74f, 75f and thus also in the gas flow 70f being freed of contamination by oxygen gas, and oxygen gas in the gas flows 76f, 88f and thus also in the gas flow 72f being freed of contamination by hydrogen gas. In principle, a further increase in operational safety can, in further alternative embodiments, also be achieved by arrangement of catalyst elements 26f, 28f in lines 62f, 64f or at inlets of the lines 62f, 64f into gas spaces 54f, 56f, or catalyst layers can be applied to sides of the electrodes 42f, 44f, 46f, 48f facing away from reaction zones 50f, 51f, 52f, 53f.

REFERENCE NUMERALS

10 Redox device
12 Redox unit
14 Redox unit
16 Fuel cell
18 Electrolyzer
20 Gas purification unit
22 Catalyst unit
24 Catalyst unit
26 Catalyst element
28 Catalyst element
30 Catalyst element
32 Catalyst element
34 Power consumer
36 Power source
38 Membrane
40 Membrane
42 Electrode
44 Electrode
46 Electrode
48 Electrode
50 Reaction zone
51 Reaction zone
52 Reaction zone
53 Reaction zone
54 Gas space
56 Gas space
58 Gas space
60 Gas space
62 Line
63 Line
64 Line
65 Line
66 Line
67 Line
68 Line
70 Gas flow
72 Gas flow
74 Gas flow
75 Gas flow
76 Gas flow
78 Heating unit
80 Heating unit
82 Gas store
84 Gas store
86 Water store
88 Gas flow
90 Cell frame
92 Cell frame
94 Water flow

The invention claimed is:

1. A redox device comprising:
at least one redox unit which is provided for carrying out at least one redox reaction with consumption and/or production of a first gas and/or of a second gas,
the at least one redox unit comprising:
at least one gas purification unit for freeing the first gas of contamination by the second gas and/or freeing the second gas of contamination by the first gas, the at least one gas purification unit comprises
at least one catalyst unit that catalyzes a reaction of oxygen gas and hydrogen gas into water, that includes at least one catalyst element consisting essentially of a platinum metal, the at least one catalyst element is implemented as a catalyst layer applied to a side of at least one electrode of the at least one redox unit, the side facing away from a reaction zone;
at least one further redox unit which is coupled to the at least one redox unit so as to allow exchange of material, wherein the at least one redox unit and the at least one further redox unit are configured as a fuel cell-electrolyzer pair;
a hydrogen line that directly connects the fuel cell-electrolyzer pair and that only includes a hydrogen storage tank located between the fuel cell-electrolyzer pair;
an oxygen line that directly connects the fuel cell-electrolyzer pair and that only includes an oxygen storage tank located between the fuel cell-electrolyzer pair; and
a water line that directly connects the fuel cell-electrolyzer pair and that only includes a water storage tank located between the fuel cell-electrolyzer pair.

2. The redox device according to claim 1, wherein the at least one redox unit is configured as a fuel cell.

3. The redox device according to claim 2, wherein the fuel cell is configured as an alkaline fuel cell.

4. The redox device according to claim 1, wherein the at least one redox unit is configured as an electrolyzer for producing hydrogen gas and/or oxygen gas.

5. The redox device according to claim 1, wherein the at least one catalyst element is arranged in and/or directly adjoining a gas space of the at least one redox unit which adjoins at least one electrode of the at least one redox unit.

6. The redox device according to claim 2, wherein the at least one gas purification unit comprises at least one catalyst unit for catalyzing a reaction of oxygen gas and hydrogen gas into water.

7. The redox device according to claim 3, wherein the at least one gas purification unit comprises at least one catalyst unit for catalyzing a reaction of oxygen gas and hydrogen gas into water.

8. The redox device according to claim 4, wherein the at least one gas purification unit comprises at least one catalyst unit for catalyzing a reaction of oxygen gas and hydrogen gas into water.

9. The redox device according to claim 1, wherein the at least one catalyst element has a cavity structure.

10. The redox device according to claim 1, wherein only the at least one redox unit comprises
   an excess hydrogen line through which excess hydrogen gas is fed back into a gas flow to the fuel cell in a circuit, and
   an excess oxygen line through which excess oxygen gas is fed back in a gas flow to the fuel cell in a circuit.

11. The redox device according to claim 1, wherein the hydrogen line includes only one excess hydrogen line, the excess hydrogen line directly extends from the redox unit to the hydrogen line at a position on the hydrogen line prior to the hydrogen storage tank to feed excess hydrogen gas back into the at least one redox unit only, and
the oxygen line includes only one excess oxygen line, the excess oxygen line directly extends from the redox unit to the oxygen line at a position on the oxygen line prior to the oxygen storage tank to feed excess oxygen gas back into the at least one redox unit only.

\* \* \* \* \*